United States Patent Office 2,834,784
Patented May 13, 1958

2,834,784
1 SUBSTITUTED-3-(1-METHYL-2-PYRROLIDINYL)-PIPERIDINE

Edgar C. Britton and Lee H. Horsley, Midland, Mich., assignors to The Dow Chemical Company, Midland, Mich., a corporation of Delaware No Drawing. Application April 1, 1957
Serial No. 649,618

3 Claims. (Cl. 260—293)

This invention relates to and has for its principal objective the provision of 1-(3-aminopropyl)-3-(1-methyl-2-pyrrolidinyl)-piperidine, a novel composition of matter that has particular utility as a bactericide and fungicide. It is also concerned with and is designed to provide 1-(2-cyanoethyl)-3-(1-methyl-2-pyrrolidinyl)-piperidine, also a new composition of matter, which has valuable use as an intermediate in the preparation of the first mentioned compound.

1-(3-aminopropyl) - 3 - (1 - methyl - 2 - pyrrolidinyl) - piperidine is a water-soluble oleaginous material that may be represented by the following structural formula:

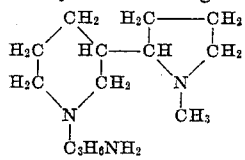

It may be prepared in a synthesis that starts from nicotine which may be catalytically hydrogenated to a hexahydronicotine intermediate which may then be cyanoethylated to 1-(2-cyanoethyl)-2-(1-methyl-2-pyrrolidinyl)-piperidine which, as a final intermediate having the structure shown in the ensuing specification, may in turn be catalytically hydrogenated to the desired product. The synthesis in this manner is illustrated by the following:

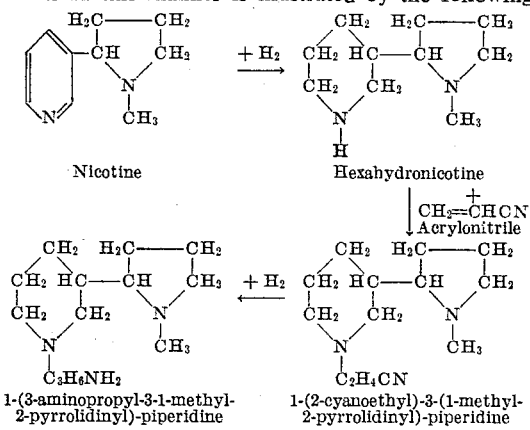

Nicotine
Hexahydronicotine 1-(3-aminopropyl-3-1-methyl-2-pyrrolidinyl)-piperidine
1-(2-cyanoethyl)-3-(1-methyl-2-pyrrolidinyl)-piperidine By way of further illustration, 212 grams of 95 percent nicotine that was obtained as a natural product from tobacco was dissolved in 400 grams of absolute ethyl alcohol and the resulting solution placed in 2-liter capacity steel rocking autoclave which contained 30 grams of Raney nickel catalyst. The mixture, after being saturated with ammonia, was sequentially hydrogenated for an initial three hour period at a temperature of 100° C. under a hydrogen pressure of 225 pounds per square inch (gauge) and then for a six hour period at a temperature of 140° C. under a hydrogen pressure of 300 pounds per square inch (gauge) during which periods the autoclave was continuously in motion to agitate its contents. After termination of the hydrogenation, the reaction mass was removed from the autoclave and filtered to remove the catalyst. The filtrate was then distilled and, after the ethanol had been separated, two fractions were collected. The first fraction, consisting of 83 grams, was comprised of a mixture of nicotine and hexahydronicotine that was collected under 3 millimeters of mercury pressure, absolute, in the temperature range from 90 to 120° C. The second fraction, consisting of 81 grams, was essentially all hexahydronicotine. It was collected in the temperature range from 120 to 124° C. under an absolute mercury pressure of 3 millimeters.

An amount of 84 grams (0.5 mole) of hexahydronicotine that was prepared in the foregoing manner was placed in a 250 milliliter flask to which, with efficient agitation, there was added 26.5 grams (0.5 mole) of acrylonitrile. An exothermic reaction occurred which raised the temperature of the reaction mass to 50° C. despite continuous cooling of the flask during the reaction. The reaction mass was then distilled to yield 68 grams of 1-(2-cyanoethyl)-3-(1-methyl-2-pyrrolidinyl)-piperidine as a water-insoluble oleaginous material obtained under 1 millimeter of mercury pressure, absolute, in the temperature range from 152 to about 162° C. The thus-obtained intermediate was calculated to have a molecular weight of about 218 (as compared to a theoretical value of 221) upon titration with N/1 hydrochloric acid wherein it was observed to have end points at about pH 4.5 and pH 2.5 which were in general correspondence to the two basic nitrogen atoms in its molecule. The refractive index ($n_d^{25}$) of the intermediate was 1.5104.

A 1 gram mole sample of the crude 1-(2-cyanoethyl)-3-(1-methyl-2-pyrrolidinyl) piperidine intermediate that was obtained according to the above-described procedure but which was not distilled out of the reaction mass in which it was formed was dissolved in 400 grams of ethanol and mixed with 50 grams of Raney nickel catalyst. The mixture was then placed in a 2 liter steel rocking autoclave, saturated with ammonia, and hydrogenated for half-an-hour at a temperature of 100° C. under a hydrogen pressure of 200 pounds per square inch (gauge). Upon termination of the hydrogenation, the reaction mass (transferred from the autoclave) was filtered to remove catalyst and subsequently distilled. There was recovered 90 grams of the pure, water-soluble oleaginous 1-(3-aminopropyl)-3-(1-methyl-2-pyrrolidinyl)-piperidine. This product was the fraction boiling between 125 and 138° C. Under an absolute pressure of about 1 millimeter of mercury. Its refractive index ($n_d^{25}$) was found to be 1.5120. When the product was titrated with N/1 hydrochloric acid solution, three end points at pH 9.7, pH 7.1 and pH 3.0 were observed. These end points were in general correspondence with the behavior that could be attributed to the three basic nitrogen atoms in the product molecule.

In representative tests conducted in a conventional manner according to generally accepted procedures, the product 1-(3-aminopropyl)-3-(1-methyl - 2 - pyrrolidinyl) piperidine inhibited the growths of various organisms, including *Aerobacterium aerogenes, Erwinia carotoxera, Salmonella typhosa, Staphylococcus aureus, Aspergillus terreus, Penicillium digitatum* and *Rhizopus nigricans.*

What is claimed is:

1. As a new composition of matter, a compound of the structure:

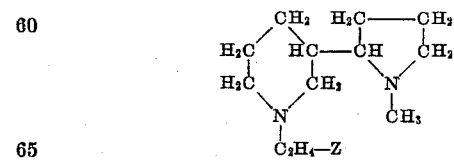

wherein Z is selected from the group consisting of a nitrile radical and an aminomethyl radical.

2. As a new composition of matter, 1-(2-cyanoethyl)-3-(1-methyl-2-pyrrolidinyl)-piperidine.

3. As a new composition of matter, 1-(3-aminopropyl)-3-(1-methyl-2-pyrrolidinyl)-piperidine.

No references cited.